2,899,402

PROCESS FOR MANUFACTURING FIBER REINFORCED CROSS-LINKED METHACRYLATE RESIN

Edward Noonan Squire, Wilmington, Del., assignor to E. I. du Pont de Nemours and Company, Wilmington, Del., a corporation of Delaware No Drawing. Application September 21, 1955
Serial No. 535,749

2 Claims. (Cl. 260—41)

This invention relates to fiber reinforced acrylic resins, such as methyl methacrylate polymer, and to methods for preparing same.

It has been known for many years that polymethyl methacrylate can be reinforced by means of glass fibers (Ellis, U.S.P. 2,176,837). Furthermore, it is now known that methyl methacrylate polymer offers certain outstanding advantages for use in reinforced structures, especially when combined with cross-linking agents. Postformability, resistance to accelerated stress-crazing, resistance to fracture by impact, resistance to weathering, excellent optical properties, color stability, and reclaimability are characteristics which make this resin attractive for use in laminates having glass fiber reinforcement. Moreover, cross linking agents for acrylic polymers are known, and they impart solvent resistance to these products.

In recent years, Swedlow has described improvements whereby the reinforced structures are prepared in a closed compressible cell (U.S.P. 2,456,093).

As pointed out in copending U.S. patent application of E. N. Squire Serial No. 490,754, filed February 28, 1955, the prior art processes for molding acrylic resins have given rise to numerous difficulties, some of which are attributable to the long molding cycles and high costs of dies. These problems have been especially troublesome in connection with the manufacture of reinforced acrylics, including polymethyl methacrylate, even where such methods involving polymerization at elevated temperatures and sufficient pressure to prevent bubble formation are used. In the latter operations press time is longer than is desirable for most economic operation.

An object of this invention is to shorten this press time in the production of glass fiber reinforced acrylic resins.

The present invention is based on the discovery that if a cross-linking component, such as a dimethacrylate of a dihydric alcohol or other monomer containing a terminal methylene group, and in the same molecule, another group capable of producing cross-links, such as a terminal methylene group, is included in the polymerization mixture, and the reinforced article is removed from the press prior to completion of the polymerization, but at a time when gelatinization (cross-linking) and polymerization have occurred to an extent sufficient to permit withdrawal of the article from the press in self-sustaining form, the residence time within the press can be greatly shortened. The polymerization can thereafter be continued in a different environment without formation of bubbles, until polymerization is complete. The overall effect of this improvement is to speed up production of the reinforced acrylic resin articles.

In one of the embodiments of the invention, the preferred starting material is an acrylic monomer-polymer syrup, exemplified by a methyl methacrylate monomer-polymer syrupy mixture. This can be obtained by partial polymerization or by admixing polymer with monomer. A suitable content of polymer is about 10 to 50 parts of polymer per 100 parts by weight of monomer, but these proportions are not particularly critical. The syrup can be stored under refrigeration conditions prior to use. When the syrup is about to be used, it is admixed with a relatively minor amount of the cross-linking agent and with a polymerization catalyst, as hereinbelow described. If fillers or pigments are to be used, they can be added during or just prior to, or soon after the introduction of catalyst and cross-linking agent. To remove air from the syrup or filled syrup, it is advisable to apply a diminished pressure (100 to 200 mm.) thereto at 5 to 10 second cycles until gross bubbling has ceased.

The mixture, prepared as above described, is impregnated into the glass fiber composition and the resulting mass is compressed in a suitable mold, formed, if desired, by plates separated by a confining gasket made of compressible material such as polychloroprene rubber. The said plates are heated, suitably to about 75° to 150° C., for a period of about 5 to 15 minutes, while a compacting pressure is applied thereto. The resulting article is thereupon removed from the press.

The partially polymerized products thus obtained can be annealed by postheating, suitably for 2 hours at 110° C. or 10 minutes at 140°, or otherwise treated as hereinbelow set forth.

The monomer employed in the practice of this invention is preferably methyl methacrylate, although other methacrylic or acrylic esters may be used. Mixtures of two or more of these acrylic or methacrylic ester monomers may be used.

The cross-linking agents which can be employed in the practice of this invention include: polyhydric alcohol esters of acrylic and alkacrylic acids; diallyl- and dimethallyl-esters of dicarboxylic acid; vinyl, allyl or methallyl esters of acrylic or alkacrylic acid; divinyl benzene and other similar polymerizable polyalkenyl aromatic compounds; divinyl ether, and the like. The quantity of cross-linking agent which is effective can be as little as 0.1% or as much as 20%, of the weight of acrylic or methacrylic monomer.

The polymerization catalysts are preferably organic peroxy compounds, among which may be mentioned diacyl peroxides such as benzoyl peroxide, dichlorobenzoyl peroxide, etc., as well as peracids, organic hydroperoxides, dialkyl peroxides and the like; or azo compounds such as those described in the Hunt patent, U.S. 2,471,959, issued May 13, 1949.

When pigments are present, azo catalysts are generally used, to avoid decoloration, or change in color. The quantity of polymerization catalyst is, in most instances, within the range of 0.1 to 1.0% of the weight of polymerizable components.

Among the fillers which may be employed are: asbestos, calcium carbonate, mica, and diatomaceous silica. The quantity of filler may be as much as 50% of the weight of syrup. The filled syrup should be readily pourable at 25° C.

The glass fiber reinforcement may be in the form of mat, fabric, roving, or other fibrous form. Conventional types of coatings may be present on such fibers. The quantity of glass fiber reinforcement is not highly critical and may be within the range of about 10% to 60% of the weight of the reinforced resin.

The press time is generally less than 20 minutes, and is preferably about 10 to 12 minutes at 20% loading, at a temperature of 85°, or 7 minutes at 50% loading, at 90° C. Pressures sufficient to cause compacting during cure are generally within the range of about 10 to 200 pounds per square inch, preferably 20 to 60 pounds per square inch.

The annealing step, if performed, can be carried out at any temperature within the range of 50° to 150° C., the preferred annealing time being dependent upon temperature as hereinabove indicated. The annealing can be carried out at atmospheric pressure. A wide variety of fabrication methods may be applied to the reinforced resin, including post-forming, machining, sawing, drilling, lathe-turning, tapping, punching (at elevated temperatures), nailing, etc., whether or not the product is annealed. In this way, various articles having a wide range of utility can be manufactured.

If desired, polymerization inhibitor may be present in the monomer. In some instances, it is desirable also to have present a stabilizer, such as methyl salicylate. Oxidizable materials, such as lauryl mercaptan, may be introduced in small amount to enhance the activity of the catalyst. Small amounts of high boiling solvents, such as dibutyl phthalate, may be introduced with the catalyst, if desired.

The equipment used in preparing the syrup can be of conventional types. This is true also of the press which is employed in the lamination step. The press plates, as is customary, are quite invariably treated with a mold release agent prior to use.

The invention is illustrated further by means of the following example.

*Example*

A syrup is prepared by rolling a mixture of 800 parts by weight polymethyl methacrylate and 2200 parts by weight of monomeric methyl methacrylate in a paint can overnight. To the resulting syrup is added, with mixing, 30 parts of benzoyl peroxide and 150 parts of ethylene dimethacrylate. A three ply mat of glass fibers (2 oz. per sq. ft.) is placed on an aluminum press plate, filling, and slightly extending above, the space enclosed by a 12 in. x 12 in. foam rubber gasket (inside measurement), which has a thickness of 0.5 in. This press plate has a temperature of 80° C. Over the mat is poured 400 grams of the syrup hereinabove just described, and another aluminum press plate is placed above the gasket to enclose the syrup and fibers. The mixture is thus heated at 80° C. for 2 minutes between these press plates without the application of any pressure. This permits adequate distribution of the syrup. During the next two minutes the pressure on the plates is very gradually raised to 100 pounds per square inch, still maintaining the temperature at 80° C. Thereafter the pressure and temperature are held constant at these levels for 10 to 15 minutes. Pressure is released, and the product is removed from the press. Polymerization is somewhat less than 90% complete, but has proceeded sufficiently to permit the article to the self-sustaining. The resulting article has a thickness of about one-eighth inch.

The foregoing example is illustrative only, and numerous modifications will occur to those who are skilled in the art. It will be understood, of course, that the product formed as above described can be subjected to any of the mechanical or thermal treatments hereinabove mentioned to produce articles of whatever shape may be desired.

For instance, the partially polymerized plate can be cut into smaller pieces for use in sundry objects. The polymerization completes itself spontaneously, or the objects can also be annealed, as above-mentioned, if this is desired.

When the cross-linking agent is one which requires relatively high temperatures for completion of the cross-linking reaction, the post-heating step is generally quite desirable. On the other hand, when the cross-linking agent contains reactive vinyl groups, and the cross links are set up from vinyl groups in the manner already understood by the art, there is no need for any post-heating, since the reactions complete themselves spontaneously. Generally, some cross-linking occurs during heating within the press, and this is the reason why the reinforced article can be removed from the press at a shorter time than would otherwise be possible.

The process hereinabove described can be carried out without the addition of the cross-linking agent, but this requires at least about 30% longer time of heating in the press. The effect of introducing the cross-linking agent is thus to increase, to an extent which is quite significant from an economic standpoint, the rate of production of sheeting and other articles composed of reinforced acrylic resins.

I claim:

1. In a process for preparing a reinforced resin article the steps which comprise admixing a monomer-polymer syrup which is a mixture of monomeric and polymerized methyl methacrylate with from 0.1 to 20%, based on the weight of said monomeric methyl methacrylate, of ethylene dimethacrylate as a cross-linking agent, and with from 10 to 60%, based on the total weight of reinforced resin, of fibrous glass reinforcement, said syrup containing from 10 to 50% by weight of the polymeric component, subjecting the resulting mixture, in the presence of a catalyst suitable for converting methyl methacrylate to solid polymer, to a temperature in the range of 75° to 150° C. under a compacting pressure within the range of 10 to 200 pounds per square inch, for a period of time less than 20 minutes until polymerization and cross-linking have proceeded far enough to permit withdrawal of the reinforced resin in self-sustaining form from the influence of said compacting pressure, said polymerization being, however, incomplete, and thereupon withdrawing the said reinforced resin from the influence of the said pressure.

2. Process of claim 1 wherein said removal of reinforced resin takes place when the polymerization is not more than 90% complete.

References Cited in the file of this patent

UNITED STATES PATENTS

| | | |
|---|---|---|
| 2,176,837 | Ellis | Oct. 17, 1939 |
| 2,273,891 | Pollack et al. | Feb. 24, 1942 |
| 2,468,094 | Marks | Apr. 26, 1949 |
| 2,539,376 | Staudinger et al. | Jan. 23, 1951 |